United States Patent [19]

Hopwood

[11] Patent Number: 5,520,238
[45] Date of Patent: May 28, 1996

[54] APPARATUS FOR ASSEMBLING BATTERY PLATES

[76] Inventor: Robert T. Hopwood, 34 Alma Road Hatherley, Cheltenham, Gloucestershire GL51 5LZ, United Kingdom

[21] Appl. No.: 302,740

[22] PCT Filed: Dec. 30, 1993

[86] PCT No.: PCT/GB93/02671

§ 371 Date: Sep. 9, 1994

§ 102(e) Date: Sep. 9, 1994

[87] PCT Pub. No.: WO94/16466

PCT Pub. Date: Jul. 21, 1994

[30] Foreign Application Priority Data

Jan. 9, 1993 [GB] United Kingdom .................. 9300356

[51] Int. Cl.$^6$ ...................................... B22D 39/00
[52] U.S. Cl. .......................... 164/337; 164/135
[58] Field of Search ..................... 164/135, 133, 164/335, 337

[56] References Cited

U.S. PATENT DOCUMENTS

| 3,515,204 | 6/1970 | McAlpine et al. | 164/337 |
| 4,108,417 | 8/1978 | Simonton et al. | 164/133 |
| 4,241,780 | 12/1980 | Eberle | 164/135 |
| 5,146,974 | 9/1992 | Mayer et al. | 164/337 |

Primary Examiner—P. Austin Bradley
Assistant Examiner—Randy Herrick
Attorney, Agent, or Firm—Young & Thompson

[57] ABSTRACT

This invention relates to apparatus for assembling battery plates and includes mould, generally indicated at 10 which defines a pair of ducts 11, 12 which supply respective sets of mould cavities 13, 14 via weirs 15. Each feed duct 11,12 has a respective pair of feed passages 16, 17 and 18, 19 extending beneath it and is interconnected to the respective feed passages by generally vertical passages 20, 21. The feed passages 16–18 are fed by a pump.

9 Claims, 3 Drawing Sheets

APPARATUS FOR ASSEMBLING BATTERY PLATES

This invention relates to an apparatus for assembling battery plates.

The term "battery" is used herein to include accumulators. In a conventional lead-acid battery it is customary to connect together the plates of each stack by means of a lead strap or post which is fixed to aligned lugs or tabs on the plates. Apparatus for casting such straps or post onto plate lugs is described in our British Patent No. 2023471B. In this apparatus there is a mould having at least one battery strap or post mould cavity and a molten feed duct adjacent thereto, a weir between the feed duct and the cavity and a lead supply passage below the duct and connected to the duct by vertical passages through which lead can well up into the duct when lead is pumped into the passage, and the spill over the weir into the cavity. A suitable pumping arrangement is described in International Patent Application No. WO 91/05625.

It is now desired to use bigger moulds, for example a single mould for assembling the plates of two batteries disposed end to end with one another or for large configuration batteries, such as truck batteries. It will be understood that this requires twice as much lead to be delivered to the mould in a comparable time scale. The obvious solutions are either to increase the flow rate through the lead supply passage or to double the cross-sectional area of the passage. The first leads to underfilling of the upstream end of the duct and overfilling of the downstream end of the duct as soon as the lead supply is shut off, whilst the latter results in geyser-like jets shooting up the upstream vertical passages.

One aspect of the invention provides an apparatus for connecting a battery plate to a metal strap or post, including a mould having a set of post or strap mould cavities, a molten metal feed duct adjacent thereto, a weir between the feed duct and the cavities, means for supplying molten lead to the duct, and hence the cavities, including a pump and at least a pair of feed passages extending below the duct and connected to the duct.

The provision of at least two feed passages has surprising advantages. First they are able to supply a large quantity of lead at a relatively low velocity, thus avoiding problems arising from the lead having excess kinetic energy, such as the unequal lead levels in the duct and secondly the mass of lead in each feed passage at the beginning of an operational cycle is relatively low and so the lead can be smoothly accelerated without creating the geyser effect mentioned above.

In one preferred arrangement one feed passage is connected to the duct along or for substantially over half of the length of the duct, whilst the other feed passage is connected to the duct along or for substantially the other half of the duct. If the connection between the half of the duct, which in flow terms, is nearest the pump, is displaced further from its associated cavities than the connection for the half of the duct which is furthest, in flow terms, from the pump, then the rate of emptying of the duct can to at least some extent be balanced.

Preferably the pump is a variable speed pump and conveniently the apparatus further comprises means for increasing the speed of the pump as metal is supplied to the duct and for subsequently reducing the speed of the pump. The pump may be a continuous rotary pump and may for example be of the type described in International Patent Application No. WO 91/05625.

The feed passages are preferably parallel and connected to the duct by generally vertical passages up which the lead can well.

In at least one embodiment there are two parallel sets of mould cavities, each having a molten feed duct and at least a pair of feed passages extending below each of the ducts and connected to their respective duct.

In that case the apparatus may further include at least one displacement body insertable into the mould to vary the volume of a duct and its associated cavities, so that it can be balanced with the volume of the other duct and cavities.

In any of the above arrangements the or each set of mould cavities may include cavities for more than one battery, in which case the cavities of the respective batteries are conveniently arranged in line, one with the other.

Although the invention has been defined above it is to be understood that it includes any inventive combination of the features set out above or in the following description.

The invention may be performed in various ways and a specific embodiment will now be described with reference to the accompanying drawings, in which.

Figure 1:
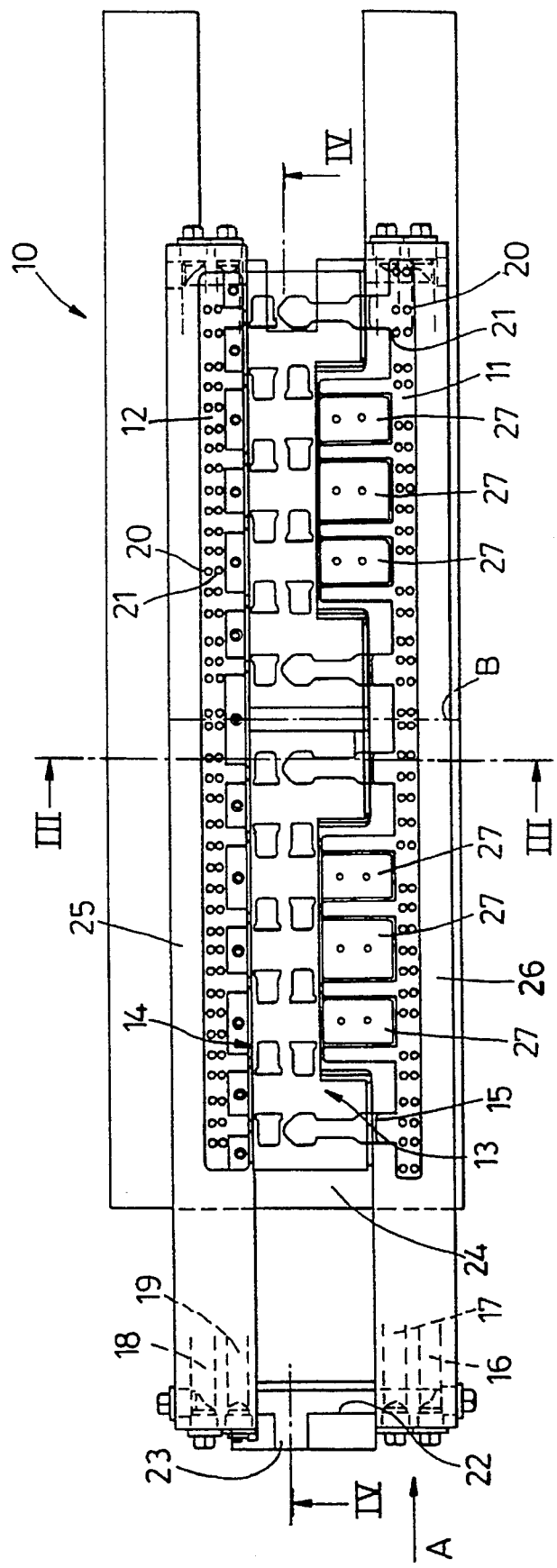
FIG. 1 is a view from above of a mould for use in assembling battery plates.
Figure 2:
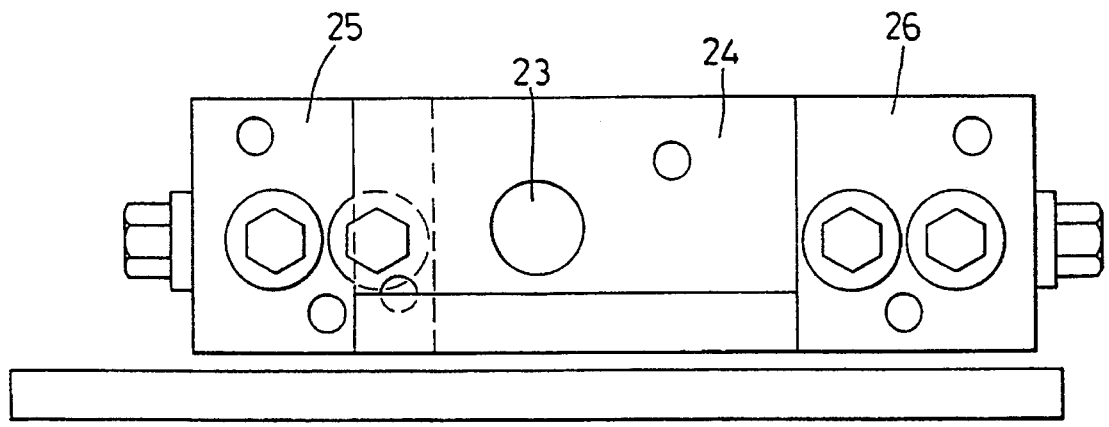
FIG. 2 is an end view on arrow A.

A mould is generally indicated at 10 and defines a pair of feed ducts 11, 12 which supply respective sets of mould cavities 13, 14 via weirs, some of which are indicated at 15. The basic construction and operation of these features is identical to that described in our British Patent No. 2023471B and the description of that Patent is incorporated into this specification for these purposes. The mould 10 is however twice the length of the mould described in our earlier Patent so that it provides mould cavities 13, 14 for two batteries, the respective groups of cavities being on either side of the line B.

Each feed duct 11, 12 has a respective pair of feed passages 16, 17 and 18, 19 extending beneath it and to either side and is interconnected to its respective feed passages by generally vertical passages 20, 21. The feed passages are in turn connected to a T-connector 22 having an inlet/outlet 23 which is connected to a lead pot and pump assembly of the type described in International Patent Application No. WO 91/05625.

It will be noted that the feed ducts 11, 12 and the feed passages 16–19 are formed in separate elements of the mould from the cavities 13, 14. This is to enable the central portion 24 to be cooled on casting, whilst the wing portions 25, 26 are maintained heated.

As has previously been mentioned the mould 10 operates basically in the manner described in the above mentioned Patent and Application. It is however distinguished from these, in as much as it is designed to mould twice as many posts and straps within an appropriate cycle time. This means that twice as much lead has to be delivered from the lead pot (not shown) into the feed ducts 11, 12 within an acceptable time. The obvious ways of attempting to achieve that would have been to use the existing supply arrangement and simply drive the pump twice as fast or to double the cross-sectional area of the feed passage or a compromise combination of the two. Surprisingly these approaches are not appropriate, because the first introduces far too much energy into the lead within the feed passage and it is extremely difficult to control the lead, particularly when it is to be sucked back. Alternatively if the cross-sectional area is doubled then the velocity of the lead is to some extent decreased but the energy still remains relatively high. This might be overcome by further increasing the cross-sectional area of the feed passage, but in practice such an approach proves to be impractical, because the mass of lead in the feed passage at start up is so great that either a very high local pressure is created, due to the lead's inertia, at the upstream end of the feed passage causing geysers of lead to shoot up the upstream vertical passages 20, 21 or if the lead is accelerated slowly the time taken to fill the mould cavities exceeds the acceptable cycle time of the apparatus.

In fact these problems can be overcome by the provision of more than one feed passage for each duct. This enables the feed passages to have a total cross-sectional area which is high enough to reduce the feed velocity, and hence the energy, to acceptable levels, but at the same time prevents the mass of lead in any particular feed passage reaching a level where it is difficult to slowly and smoothly accelerate the lead within an acceptable time. Thus despite the fact that frictional and constructional considerations would lead one away from introducing multiple feed passages, this is in fact the appropriate solution.

It will be appreciated that to achieve the desired smooth acceleration of the lead a rotary pump of the type described in International Patent Application No. WO 91/05625 is extremely desirable but any appropriate lead supply stream can be used. Depending on the dimensions and demands of the mould, it may be appropriate to use more than two feed passages for each duct and they could be fed directly and individually from the lead pot.

It is desirable that the volume created by a feed duct and its associated cavities is equal to the equivalent volume of the other feed duct and its cavities. If it is not, then cavity volume filling will take place at different rates with the result that the filling part of the cycle will take too long. In order to allow for such a balancing operation to take place, removable displacement bodies 27 are provided. By selecting bodies of different sizes, the volume can be fine tuned.

It will also be noted that the bottom of each feed duct 11, 12 as it approaches the weir 15 is formed as a ramp beach-like portion 28 to assist in the dissipation of any waves which may be set up within the feed ducts 11, 12. However in at least some configurations this may lead to such a slow rise in the lead level in the duct that an even break over the weirs 15 may not be achieved. In that case the ramp 28 may be replaced by a narrow channel to provide a more rapid rise.

Figure 3:
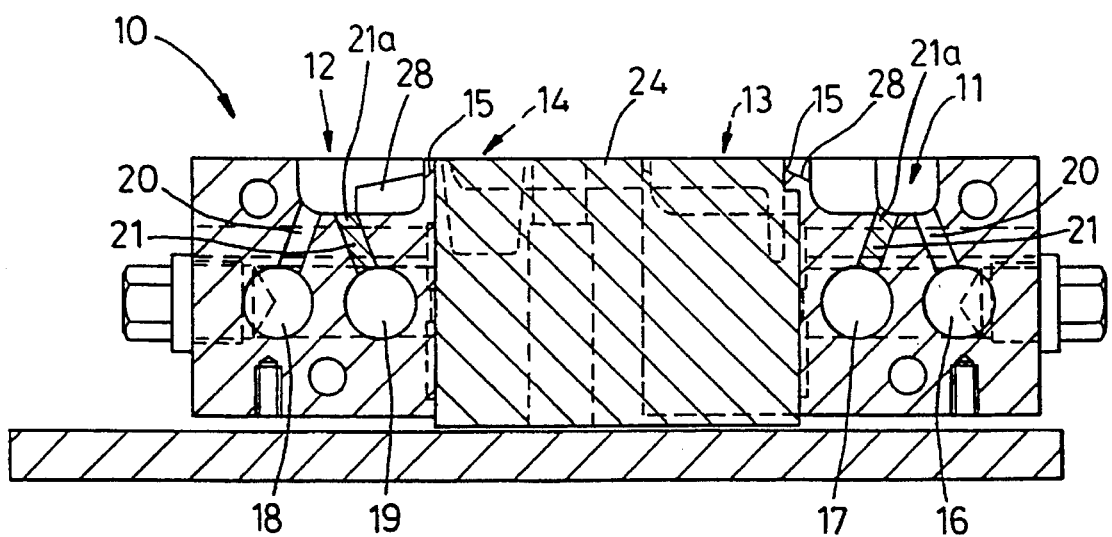
FIG. 3 is a cross-sectional view on the line III to III in FIG. 1.
Figure 4:
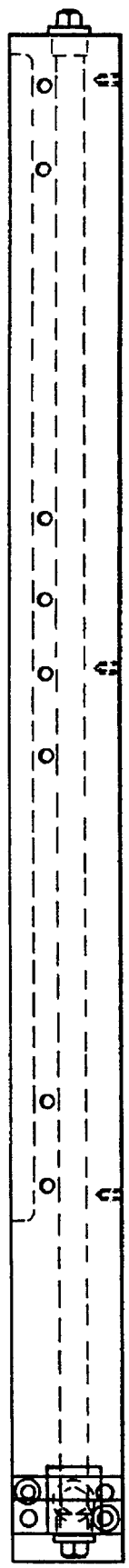
FIG. 4 is a longitudinal section of the mould of FIG. 1 taken along the line IV to IV.

When the lead is allowed to drain back down out of the ducts 11, 12, there may be significant time lag between when the lead starts to drain from the end of the ducts to the left of the line B in FIG. 1 and when the lead starts to drain from the ends of the ducts to the right of line B. This means that the 'left' end can fall to a lower level than is necessary and hence more lead needs to be pumped back in for the next mould. Cycle time is hence increased. This can to some extent be overcome by blocking at least some of the vertical channels 21 to the left of line B, as shown in FIG. 3 at 21a, and at least some of the vertical channels 20 to the right of line B. This has the effect of relatively increasing the path that the lead to the left of line B has to travel and also makes it easier to start lead flowing at the right hand end of duct 19.

I claim:

1. Apparatus for connecting a battery plate to a metal strap or post, including a mould having a set of post or strap mould cavities, a molten metal feed duct adjacent thereto, a weir between the feed duct and the cavities, means for supplying molten lead to the duct, and hence the cavities, including a pump and at least a pair of feed passages extending below the duct and connected to the duct.

2. Apparatus as claimed in claim 1 wherein one feed passage is connected to the duct along substantially one half of the length of the duct, whilst the other feed passage is connected to the duct along substantially the other half of the duct.

3. Apparatus as claimed in claim 2 wherein the connection between the half of the duct which is nearest the pump, is displaced further from its associated cavities than the connection for the half of the duct which is furthest from the pump.

4. Apparatus as claimed in claim 1 wherein the feed passages are substantially parallel and connected to the duct by generally vertical passages up which lead can well.

5. Apparatus as claimed in claim 1 wherein the pump is a variable speed pump.

6. Apparatus as claimed in claim 4 further comprising means for increasing the speed of the pump as metal is supplied to the duct and for subsequently reducing the speed of the pump.

7. Apparatus as claimed in claim 1 further comprising two parallel sets of mould cavities, each having a molten feed duct and at least a pair of feed passages extending below each of the ducts and connected to their respective duct.

8. Apparatus as claimed in claim 7 wherein the apparatus further includes at least one displacement body insertable into the mould to vary the volume of a duct and its associated cavities, so that it can be balanced with volume of the other duct and cavities.

9. Apparatus as claimed in claim 7 wherein said set of mould cavities includes cavities for more than one battery.

\* \* \* \* \*